(12) United States Patent
Espelien

(10) Patent No.: US 8,161,111 B2
(45) Date of Patent: Apr. 17, 2012

(54) SYSTEM AND METHOD FOR IDENTIFYING COMMON MEDIA CONTENT

(75) Inventor: Joel Espelien, San Diego, CA (US)

(73) Assignee: Packet Video, Corp, San Diego, CA (US)

( * ) Notice: Subject to any disclaimer, the term of this patent is extended or adjusted under 35 U.S.C. 154(b) by 429 days.

(21) Appl. No.: 11/706,480

(22) Filed: Feb. 15, 2007

(65) Prior Publication Data

US 2007/0226315 A1 Sep. 27, 2007

Related U.S. Application Data

(60) Provisional application No. 60/786,221, filed on Mar. 27, 2006.

(51) Int. Cl.
*G06F 15/16* (2006.01)
*G09G 5/00* (2006.01)

(52) U.S. Cl. .................... 709/205; 709/248; 345/156

(58) Field of Classification Search ............ 709/205
See application file for complete search history.

(56) References Cited

U.S. PATENT DOCUMENTS

| | | | | |
|---|---|---|---|---|
| 4,007,450 A * | 2/1977 | Haibt et al. | | 709/226 |
| 5,113,519 A * | 5/1992 | Johnson et al. | | 707/201 |
| 5,666,530 A * | 9/1997 | Clark et al. | | 707/201 |
| 5,790,848 A * | 8/1998 | Wlaschin | | 707/201 |
| 5,809,298 A * | 9/1998 | Nakada | | 707/2 |
| 5,862,325 A | 1/1999 | Reed et al. | | |
| 6,161,132 A * | 12/2000 | Roberts et al. | | 709/219 |
| 6,167,092 A | 12/2000 | Lengwehasatit | | |
| 6,317,797 B2 * | 11/2001 | Clark et al. | | 710/5 |
| 6,498,865 B1 | 12/2002 | Brailean et al. | | |
| 6,529,552 B1 | 3/2003 | Tsai et al. | | |
| 6,675,205 B2 * | 1/2004 | Meadway et al. | | 709/219 |
| 6,742,028 B1 * | 5/2004 | Wang et al. | | 709/223 |
| 6,952,717 B1 * | 10/2005 | Monchilovich et al. | | 709/205 |
| 7,006,631 B1 | 2/2006 | Luttrell | | |
| 2002/0087632 A1 * | 7/2002 | Keskar | | 709/204 |
| 2003/0233383 A1 * | 12/2003 | Koskimies | | 707/204 |
| 2003/0233399 A1 * | 12/2003 | Prohel et al. | | 709/201 |

(Continued)

FOREIGN PATENT DOCUMENTS

WO WO2007/126718 11/2007

OTHER PUBLICATIONS

PCT Written Opinion, Jun. 29, 2008.

(Continued)

*Primary Examiner* — Jeffrey Pwu
*Assistant Examiner* — Guang Li
(74) *Attorney, Agent, or Firm* — Patents+TMS, P.C.

(57) ABSTRACT

A system and a method identify common media content with two or more terminals that are remote with respect to each other for users to access, to consume and/or to experience a multimedia file of the common media content. A list of the common media content of the first terminal and to the second terminal is displayed via the first terminal and the second terminal. The first terminal and the second terminal may be synchronized for the first user and for the second user to experience the multimedia file via the shared viewing session. A communication associated with the multimedia file may be transmitted between the first terminal and the second terminal via a shared communication channel over the network before, during and/or after a playback of the multimedia file.

21 Claims, 1 Drawing Sheet

U.S. PATENT DOCUMENTS

| | | |
|---|---|---|
| 2004/0070678 A1 | 4/2004 | Toyama et al. |
| 2004/0174817 A1* | 9/2004 | Jabri et al. .................... 370/238 |
| 2004/0190389 A1* | 9/2004 | Nakano et al. ............. 369/30.03 |
| 2006/0002681 A1* | 1/2006 | Spilo et al. ...................... 386/46 |
| 2006/0013148 A1 | 1/2006 | Burman et al. |
| 2006/0029041 A1 | 2/2006 | Jabri et al. |
| 2006/0056416 A1 | 3/2006 | Yang et al. |
| 2006/0095516 A1* | 5/2006 | Wijeratne .................... 709/205 |
| 2006/0155575 A1* | 7/2006 | Gross ............................... 705/1 |
| 2006/0159037 A1 | 7/2006 | Jabri et al. |
| 2006/0176877 A1 | 8/2006 | Jabri et al. |
| 2006/0195790 A1* | 8/2006 | Beaupre et al. ................ 715/727 |
| 2006/0210245 A1* | 9/2006 | McCrossan et al. ............ 386/95 |
| 2007/0011277 A1 | 1/2007 | Neff et al. |
| 2007/0150539 A1* | 6/2007 | O'Sullivan et al. ........... 709/204 |
| 2010/0169369 A1* | 7/2010 | Wang et al. .................... 707/770 |

OTHER PUBLICATIONS

PCT Search Report, Jun. 29, 2008.

* cited by examiner

SYSTEM AND METHOD FOR IDENTIFYING COMMON MEDIA CONTENT

This application claims the benefit of U.S. Provisional Application Ser. No. 60/786,221, filed Mar. 27, 2006.

BACKGROUND OF THE INVENTION

The present invention generally relates to a system and a method for identifying common media content. More specifically, the present invention relates to a system and a method for identifying common media content which may be consumed by and/or may be experienced by a first user on a first terminal and a second user on a second terminal. The first terminal and the second terminal may be connected via a network for the first user and the second user to communicate during consumption of a multimedia file from the common media content. The first user may invite and/or may request the second user to participate in a shared viewing session of the multimedia file with the first user via the first terminal, the second terminal and/or the network. The second terminal may acquire and/or may obtain a version of the multimedia file from a network source for consumption during the shared viewing session between the first user and the second user. The multimedia file and the version of the multimedia file may be accessible and/or may be consumable by the first terminal and the second terminal, respectively, during the shared viewing session between the first user and the second user, respectively.

The second terminal may transmit and/or may send a first message to the first terminal via the network to signal and/or to indicate that the second terminal has access to a version of the multimedia file for consumption during the shared viewing session. The first terminal may display a list of common media content to the first user which may contain an indicator associated with the multimedia file and/or the second user. The indicator and/or the list of common media content may indicate to the first user that the second terminal may be prepared to consume and/or to display the version of the multimedia file to the second user. The first terminal and the second terminal may display the multimedia file and the version of the multimedia file, respectively, to the first user and the second user, respectively. As a result, the first user and the second user may consume and/or may experience the multimedia file and the version of the multimedia file, respectively, in the shared viewing session. A communication associated with the shared viewing session may be transmitted between the first terminal and the second terminal during the shared viewing session via the network.

It is generally known, for example, that two or more viewers desire to consume and/or to experience media programming with each other. Traditionally, the two or more viewers gather and/or meet at a first location to view and/or to consume the media programming via an output device for experiencing the media programming with each other. The output device is, typically, a television, a projector screen, a computer terminal or a monitor which is connected to a service provider for transmitting and/or for broadcasting the media programming to the output device. The first location may be, for example, a home, a school, a library, a conference room, an office and/or the like. The media programming is transmitted by, is accessible from and/or is provided from a service provider for transferring the media programming to an output device for the media programming to be consumed and/or to be experienced by the two or more viewers. Typically, the content provider may be, for example, a broadcast television station, a cable television station, a satellite television station and/or the like. As a result, the first location for allowing the media programming to be consumed and/or to be experienced by two or more viewers is stationary with respect to the service provider. Moreover, the viewers may discuss and/or may communicate with each other during the consumption of the media programming at the first location.

Traditionally, a first viewer and a second viewer consume and/or experience the media programming by sharing and/or by transmitting a digital multimedia file between a first computer terminal (hereinafter "the first terminal") of the first viewer and a second computer terminal (hereinafter "the second terminal") of the second viewer via a network. The first viewer may be remote with respect to the second viewer. The first computer terminal and the second computer terminal may use a computer application to transmit, to receive and/or to access the digital multimedia file of the media programming via the network. As a result, the first viewer may consume and/or may experience the media programming via the digital multimedia file of the first terminal at a first period of time. Additionally, the second viewer may consume and/or may experience the media programming via the digital multimedia file and/or the second terminal at a second period of time. Typically, the second period of time is different than the first period of time which prevents the first viewer and the second viewer from sharing in the consumption and/or in the experience of the media programming. Moreover, the first viewer and the second viewer of the media programming may be prevented from sharing one or more communications associated with the media programming during consumption of and/or during experiencing the media programming via the first terminal and the second terminal, respectively.

For example, sharing the digital multimedia file of the media programming between the first terminal and the second terminal may violate a copyright associated with the media programming. Further, the digital multimedia file of the media programming may be protected by digital rights management which may prevent sharing the digital multimedia file between the first terminal and the second terminal via the network. The digital rights management associated with the digital multimedia file may prevent the computer application from transmitting and/or from sharing the digital multimedia file between the first terminal and the second terminal. As a result, the second viewer may be prevented from consuming and/or experiencing the media programming by the digital rights management.

A format and/or a file size of the digital multimedia file may prevent the multimedia file from being shared and/or from being transmitted between the first terminal and the second terminal via the computer application and/or the network. Further, sharing the digital multimedia file between the first terminal and the second terminal via the computer application and/or the network may be inefficient and/or may be unsuccessful based on the format and/or the file size of the digital multimedia file. The second viewer may be prevented from consuming and/or from experiencing the media programming by the format and/or by the file size of the digital multimedia file. As a result, the first viewer and/or the second viewer may be prevented from sharing in the consumption of and/or in the experiencing of the media programming without consuming the media programming with a single computer terminal in a single location.

A need, therefore, exists for a system and a method for identifying and sharing an experience of common media content without sharing digital multimedia files. Additionally, a need exists for a system and a method for identifying common media content which may allow a first user and a second user which may be remote with respect to the first user to share consuming and/or experiencing the common media content. Further, a need exists for a system and a method for identifying common media content which may allow a first user and a second user to share consuming and/or experiencing the common media content via a first terminal and a second terminal, respectively, during a shared viewing session. Still further, a need exists for a system and a method for identifying common media content which may allow a first user and a second user to share consuming and experiencing the common media content via two or more remote terminals without violating a copyright associated with the common media content. Moreover, a need exists for a system and a method for identifying common media content which may allow users to share consuming and experiencing the common media content via two or more remote terminals without transferring the common media content between the two or more remote terminals. Furthermore, a need exists for a system and/or a method for identifying common media content which may allow two or more users to consume and/or to experience the common media content via two or more terminals at two or more locations over a network.

SUMMARY OF THE INVENTION

The present invention generally relates to a system and a method for identifying common media content. The system and method may allow a first terminal of a first user to connect to a second terminal of a second user via a network for sharing an experience of consuming the common media content by the first terminal and the second terminal, respectively. The first terminal may invite the second terminal to participate in a shared viewing session between the first terminal and the second terminal for consuming and/or for experiencing the common media content by the first user and the second user, respectively. The second terminal may receive information associated with the common media content from the first terminal to identify, to obtain and/or to access the common media content for consuming and/or for experiencing by the second terminal. The second terminal may indicate to the first terminal that a multimedia file of the common media content may be available for consuming and/or for experiencing by the second terminal. Alternatively, the second terminal may obtain, may procure and/or may access a version of the multimedia file from a network source via the network for consuming the common media content.

The first terminal may display and/or may indicate that the second terminal may be prepared to consume the common media content via a common media list on the first terminal. The common media list may display and/or may indicate attributes and/or information associated with the common media content, the first user and/or the second user. The first terminal and the second terminal may be synchronized to share consuming and/or experiencing the common media content by the first terminal and/or the second terminal in the shared viewing session. The first user and the second user may consume, may display and/or may experience the common media content at a first time period for sharing the experience of common media content in the shared viewing session. Communications associated with the common media content and/or with the shared viewing session may be transmitted between the first terminal by the first user and the second terminal by the second user via the network. A third user may determine whether to associate with and/or to communicate with the first user and/or the second user based on the communications, the attributes and/or the information of the common media content. The communications, the attributes and/or the information may be accessible from the common media list and/or the common media content by the first user, the second user and/or the third user.

In an embodiment of the present invention, a system for identifying multimedia for a first user and a second user is provided. The system has a first terminal connected to a network wherein the first terminal has a first media library of multimedia files wherein the first terminal allows the first user to consume multimedia files of the first media library; and a second terminal connected to the network wherein the second terminal has a second media library of multimedia files wherein the second terminal allows the second user to consume multimedia files of the second media library wherein the first terminal and the second terminal identify a list of common media content wherein the list of common media content is the multimedia files of the first media library that correspond to the multimedia files of the second media library wherein a common media session of synchronized consumption of a shared multimedia file is initiated for the first terminal and the second terminal wherein the shared multimedia file is selected from the list of common media content.

In an embodiment, the list of common media content is generated based on metadata associated with the multimedia files of the first media library and the second media library.

In an embodiment, the system has an electronic program guide that displays the list of common media content on the first terminal.

In an embodiment, the first user pauses consumption of the shared multimedia file on the first terminal to pause consumption of the shared multimedia file on the second terminal.

In an embodiment, the system has a graphic user interface that allows the first user to select a multimedia file.

In an embodiment, the system has a network source connected to the network wherein the network source transmits to the second terminal a new multimedia file corresponding to one of the multimedia files of the first media library that is not in the second media library.

In an embodiment, the first terminal and the second terminal transmit a communication to each other that the common media session is ready to initiate.

In an embodiment, the first terminal sends a message to the second terminal indicating the multimedia files of the first media library that correspond to multimedia files of the second media library.

In an embodiment, the list of common media content is multimedia files of the first media library that correspond to multimedia files of the second media library and multimedia files of a third media library.

In an embodiment, the first user transmits a communication from the first terminal to the second terminal via the network.

In another embodiment, a method is provided for identifying multimedia for a first user and a second user, the method comprising the steps of: connecting a first terminal and a second terminal to a network wherein the first terminal has a first media library of multimedia files and the second terminal has a second media library of multimedia files; generating a list of common media content wherein the list of common media content is the multimedia files of the first media library that correspond to the multimedia files of the second media library; displaying an electronic program guide via the first terminal and the second terminal wherein the electronic program guide provides the list of common media content; and initiating a common media session of synchronized consumption of a shared multimedia file wherein the shared multimedia file is selected from the list of common media content and consumed via the first terminal and the second terminal.

In an embodiment, a method is provided for identifying multimedia further comprising the step of: updating the list of common media content on a periodic basis.

In an embodiment, a method is provided for identifying multimedia further comprising the step of: sending a message from the first terminal to the second terminal inviting the second user to partake in the shared media session of the shared multimedia file.

In an embodiment, a method is provided for identifying multimedia further comprising the step of: consuming the multimedia file on a third terminal.

In an embodiment, a method is provided for identifying multimedia further comprising the step of: providing a graphic user interface that allows the first user and the second user to select the shared multimedia file from the list of common media content.

In an embodiment, a method is provided for identifying multimedia further comprising the step of: indicating multimedia files that are in the first media library that do not have corresponding multimedia files in the second media library.

In an embodiment, a method is provided for identifying multimedia further comprising the step of: transmitting a new multimedia file that corresponds to one of the multimedia files of the first media library that is not in the second media library.

In another embodiment, a system is provided for identifying multimedia for a first user and a second user. The system has a network connected to a database of multimedia files; a first terminal connected to the network wherein the first terminal has a first media library of multimedia files; and a second terminal connected to the network wherein the second terminal has a second media library of multimedia files wherein the first terminal and the second terminal identify a multimedia file of the first media library that is not one of the multimedia files of the second library wherein the second terminal accesses the database via the network source to obtain the multimedia file wherein a common media session of synchronized consumption of the multimedia file is initiated for the first terminal and the second terminal.

In an embodiment, the identification of the multimedia file of the first library that does not have a corresponding multimedia file of the second library is based on metadata associated with the multimedia files of the first library and the second library.

In an embodiment, communications are transmitted from the first user via the first terminal and the second user via the second terminal wherein the communications initiate the shared media session.

It is, therefore, an advantage of the present invention to provide a system and a method for identifying common media content. Another advantage of the present invention is to provide a system and a method for identifying common media content which may allow users at more than one location to experience the common media content via two or more remote terminals over a network.

Another advantage of the present invention is to provide a system and a method for identifying common media content which may allow users to experience and/or to consume the common media content at two or more remote locations without violating a copyright associated with the common media content.

Yet another advantage of the present invention is to provide a system and a method for identifying common media content which may allow users to experience and/or to consume the common media content at two or more remote locations without transferring and/or sharing the common media content between a first terminal and a second terminal.

A further advantage of the present invention is to provide a system and a method for identifying common media content which may access, may locate and/or may obtain the common media content to share experiencing and/or consuming the common media content between users at two or more remote locations.

Moreover, an advantage of the present invention is to provide a system and a method for identifying common media content which may invite users to participate in a shared viewing session for the users to share experiences of the common media content via two or more remote terminals.

Another advantage of the present invention is to provide a system and a method for identifying common media content which may procure and/or may obtain a multimedia file of the common media content from a network provider to share experiencing the common media content with two or more remote terminals.

Yet another advantage of the present invention is to provide a system and a method for identifying common media content which may provide a list of the common media content for users to identify which digital multimedia files may be experienced in a shared viewing session between the users via two or more remote terminals.

Another advantage of the present invention is to provide a system and a method for identifying the common media content which may allow users to associate with each other based on the common media content and/or attributes of each of the users.

Yet another advantage of the present invention is to provide a system and a method for identifying common media content which may provide a list of the common media content that indicates that a digital multimedia file is accessible by users for experiencing the digital multimedia file via two or more remote terminals.

A still further advantage of the present invention is to provide a system and a method for identifying common media content which may identify criteria and/or attributes of the common media content for users to determine whether to share experiencing and/or consuming the common media content.

Moreover, an advantage of the present invention is to provide a system and a method for identifying common media content which may synchronize playback of the common media content by two or more remote terminals to share experiencing and/or consuming the common media content by users via the two or more remote terminals.

Another advantage of the present invention is to provide a system and a method for identifying common media content which may commence and/or may start the shared media session after the remote terminals receive signals and/or messages from each of the terminals indicating that each of the terminals may be prepared to consume the common media content.

Yet another advantage of the present invention is to provide a system and a method for identifying common media content which may synchronize playback of the common media content by two or more remote terminals based on advertising media associated with the common media content and/or on procurement of the common media content.

Moreover, an advantage of the present invention is to provide a system and a method for identifying common media content which may provide a set of users and/or a subset of users for participating in shared media sessions of the common media content via two or more remote terminals based on an attribute of the users in the set and/or in the subset.

Additional features and advantages of the present invention are described in, and will be apparent from, the detailed description of the presently preferred embodiments and from the drawings.

DETAILED DESCRIPTION OF THE PREFERRED EMBODIMENTS

Figure 1:
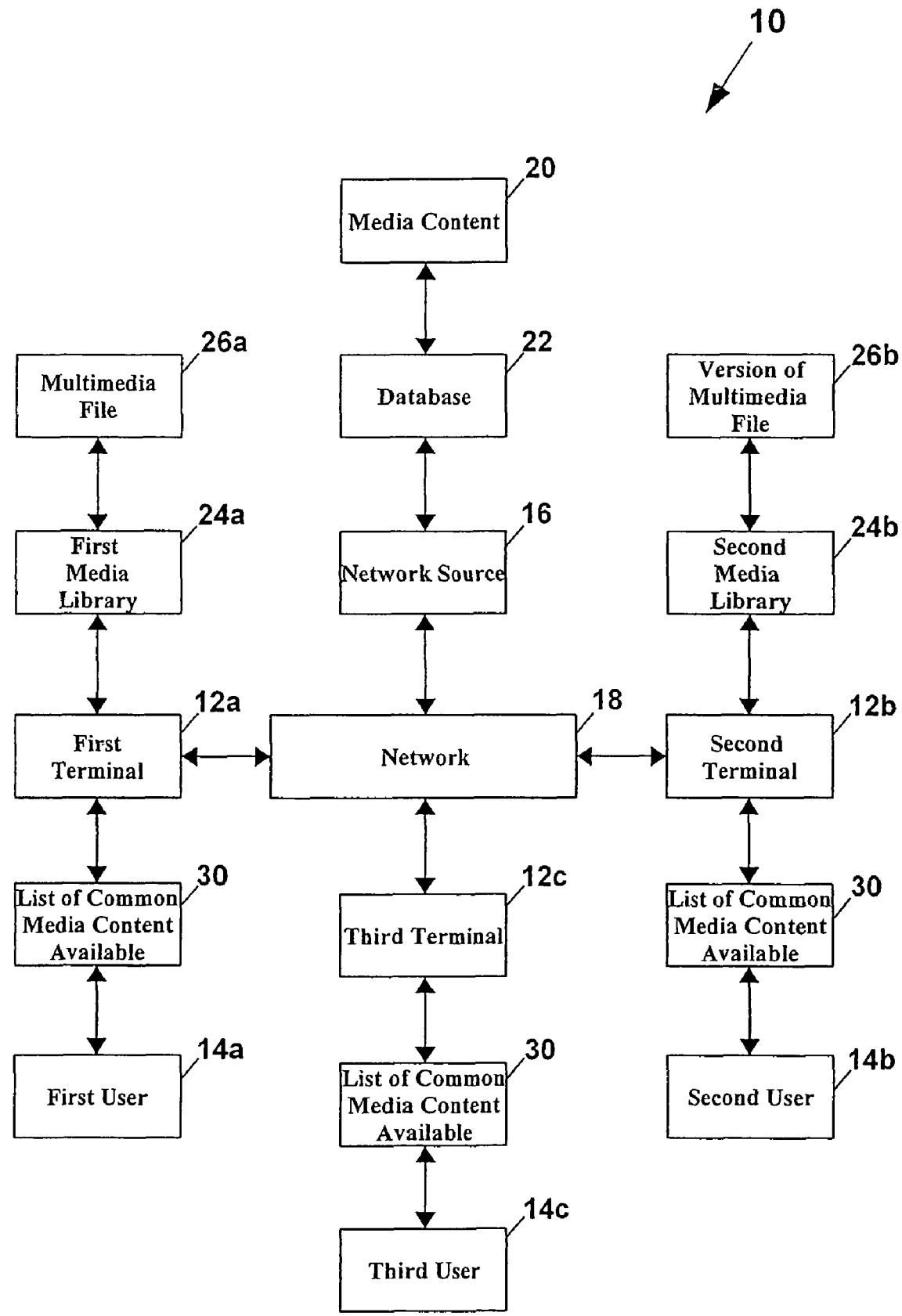
FIG. 1 illustrates a black box diagram of a system for identifying common media content in an embodiment of the present invention.

The present invention relates to a system and a method for identifying common media content. The system and the method may provide two or more terminals which are remote with respect to each other for users to access, to consume and/or to experience a multimedia file of the common media content. A first terminal of a first user may connect to and/or may invite a second terminal of a second user to participate in a shared viewing session of the multimedia file via a network. The first terminal may transmit information associated with the multimedia file to the second terminal for the second terminal to determine whether a version of the multimedia file may be accessible and/or may be consumable by the second terminal. The second terminal may procure and/or may obtain the version of the multimedia file from a network source via the network.

The second terminal may communicate with the first terminal to indicate that the second terminal may be capable of accessing, of consuming and/or of displaying the version of the multimedia file with the first terminal in the shared viewing session. A list of the common media content available for the first terminal and for the second terminal may be displayed via the first terminal and the second terminal, respectively. The list of the common media content available may be updated, may be modified and/or may be revised based on a media library of the first terminal and/or of the second terminal. An attribute and/or data associated with the multimedia file, the first user and/or the second user may be displayed and/or may be identified via the list of common media content available. The first terminal and the second terminal may be synchronized for the first user and the second user to share consuming and/or experiencing the multimedia file via the shared viewing session. A communication associated with the multimedia file may be transmitted between the first terminal and the second terminal via a shared communication channel over the network before, during and/or after a playback of the multimedia file.

Referring now to the drawings wherein like numerals refer to like parts, FIG. 1 illustrates a system 10 for identifying common media content. The system 10 may have a first terminal 12a of a first user 14a which may be connected to a second terminal 12b of a second user 14b via a data communication network 18 (hereinafter "the network 18"). Further, the system 10 may have a third terminal 12c of a third user 14c which may be connected to the first terminal 12a and/or the second terminal 12b via the network 18. The first terminal 12a, the second terminal 12b and/or the third terminal 12c (hereinafter "the terminals 12a-12c") may be connected to and/or may be in communication with each other via the network 18. The first user 14a, the second user 14b and/or the third user 14c (hereinafter "the users 14a-14c") may be local and/or may be remote with respect to each other. The terminals 12a-12c may be local and/or may be remote with respect to each other. As a result, the users 14a-14c may be connected and/or may be in communication with each other via the network 18.

A network source 16 may be connected to and/or may be in communication with the terminals 12a-12c for delivering media content 20 to the terminals 12a-12c via the network 18. The media content 20 may be stored in and/or may be contained in a database 22 of the network source 16. The database 22 may be connected to and/or may be in communication with the network source 16 for accessing and/or for delivering the media content 20 to the terminals 12a-12c by the network source 16 via the network 18. The database 22 and/or the media content 20 may be remote or may be local with respect to the network source 16. The media content 20 may be accessible by the terminals 12a-12c via the network source 16 and/or the network 18. The media content 20 of the database 22 may be accessible by the terminals 12a-12c via the network 18 and/or the network source 16 for consuming and/or for experiencing the media content 20.

A first media library 24a (hereinafter "the first library 24a") may be connected to and/or may be in communication with the first terminal 12a for storing and/or for accessing a digital multimedia file 26a (hereinafter "the multimedia file 26a") and/or the media content. The first user 14a and/or the first terminal 12a may access, may obtain and/or may receive the multimedia file 26a from the media content 20 via the network source 16 and/or the network 18. The first library 24a may be remote or may be local with respect to the first terminal 12a and/or the first user 14a. The first terminal 12a may access, may display and/or may render the multimedia file 26a to the first user 14a. As a result, the first user 14a may consume and/or may experience the multimedia file 26a via the first terminal 12a and/or the first library 24a.

A second media library 24b (hereinafter "the second library 24b") may be connected to and/or may be in communication with the second terminal 12b for storing and/or for accessing a version of the digital multimedia file 26b (hereinafter "the multimedia file 26b") which may be stored within the second library 24b. The second-user 14b and/or the second terminal 12b may access, may obtain and/or may receive the multimedia file 26b from the media content 20 in the database 22 via the network source 16 and/or the network 18. The second library 24b may be remote or may be local with respect to the second terminal 12b and/or the second user 14b. The second terminal 12b may access, may display and/or may render the version of the multimedia file 26b to the second user 14b. As a result, the second user 14b may consume and/or may experience the multimedia file 26b via the second terminal 12b and/or the second library 24b.

The network source 16 may be, for example, a media station, a media content provider, a media content library, a media exchange provider and/or the like. The media station may be, for example, a television station, a radio station, a streamed radio source, a streamed video source, a satellite radio station and/or the like. The media content provider may be, for example, a cable television provider, a satellite television provider, a satellite radio provider, an internet radio provider, a streaming audio provider, a streaming video provider and/or the like. The media content library may be a media content retailer and/or a distributor, such as, for example, a media store, a file-sharing store, an online media distributor and/or the like. It should be understood that the network source 16 may be any source capable of transferring the media content to the terminals 12a-12c.

The media content 20 stored in the database 22 may contain the multimedia file 26a and/or the multimedia file 26b (collectively known hereinafter as "the multimedia files 26a, 26b"). The multimedia files 26a, 26b may be, such as, for example, an audio signal, video frames, a data feed, a data stream, a musical composition, a radio program, an audio book, an audio program and/or the like. Further, the multimedia files 26a, 26b may be, for example, a cable television program, a satellite television program, a public access program, a motion picture, a music video, an animated work, a video program, a video game, a soundtrack, a video track of an audiovisual work, a dramatic work, a film score, an opera and/or the like. The database 22 may contain and/or may store one or more multimedia files (not shown in the FIGURE) and/or any amount of data (not shown in the FIGURE) as known to one of ordinary skill in the art. The present invention should not be limited to a specific embodiment of the data and/or the multimedia files 26a, 26b. It should be understood that the data and/or the multimedia files 26a, 26b may be any data and/or any digital media files, respectively, as known to one of ordinary skill in the art.

The multimedia files 26a, 26b may have metadata which may be, for example, a communication and/or information associated with, related to and/or corresponding to the multimedia files 26a, 26b, the media content 20 and/or network source 16. The metadata may be formatted in a standard data format, such as, for example, XML, RDF, RSS, MathML, XHTML, SVG, cXML, Flash, MS CSF and/or the like. The communication may be, for example, text, a graphic, a voice recording, a video recording, a conferencing recording, a comment, a note, a review, a correspondence, a commentary, a message, a discussion, a notice, a bulletin, a memorandum, news and/or the like which may be related to, may be associated with and/or may be based on the multimedia files 26a, 26b, the media content 20 and/or the network source 16. The present invention should not be limited to a specific embodiment of the standard data format of the metadata and/or the communication.

The information of the metadata may be, for example, a name of the multimedia files 26a, 26b, a type of the multimedia files 26a, 26b and/or the like. The type of the multimedia files 26a, 26b may be, for example, a musical composition, a radio program, an audio book, an audio program, a television program, a movie, a music video, an animated work, a video program, a video game and/or a soundtrack and/or a video track of an audiovisual work, a dramatic work, a film score, an opera and/or the like.

Further, the information may be, for example, a year of the multimedia files 26a, 26b, an artist associated with the multimedia files 26a, 26b, a publisher or a copyright owner of the multimedia files 26a, 26b, a genre associated with the multimedia files 26a, 26b and/or a length of time of the multimedia files 26a, 26b. Moreover, the information may be, for example, a content rating of the multimedia files 26a, 26b, a language associated with the multimedia files 26a, 26b, a key word associated with the multimedia files 26a, 26b, a review of the multimedia files 26a, 26b, a source of the multimedia files 26a, 26b and/or the like. The present invention should not be limited to a specific embodiment of the communication and/or the information of the metadata. It should be understood that the information may be any communication and/or information as known to one of ordinary skill in the art.

The terminals 12a-12c may be, for example, a computer terminal, a mobile device, a set-top box, and/or an electronic device capable of consuming, of receiving, of processing, and/or of displaying the multimedia files 26a, 26b and/or the metadata associated with the multimedia files 26a, 26b. The set-top box may be connected to a display (not shown in the FIGURE) for viewing, for consuming and/or for displaying the multimedia files 26a, 26b and/or the metadata associated with the multimedia files 26a, 26b. Alternatively, the set-top box may be, for example, a digital multimedia broadcasting-enabled television and/or the like. In an embodiment, the mobile device may be, for example, a 4G mobile device, a 3G mobile device, an internet protocol (hereinafter "IP") video cellular telephone, an ALL-IP electronic device, a PDA, a laptop computer, a mobile cellular telephone, a satellite radio receiver, a portable digital audio player, a portable digital video player and/or the like. It should be understood that the terminals 12a-12c may be any terminal capable of transmitting, capable of receiving, capable of processing, capable of consuming and/or capable of displaying the metadata and/or the multimedia files 26a, 26b as known to one having ordinary skill in the art.

The network 18 may be a fixed network, such as, for example, a cabled network, a permanent network and/or the like. In an embodiment, the network 18 may be a temporary network, such as, for example, a modem network, a null modem network and/or the like. In an embodiment, the network 18 may be, for example, a local area network, a metropolitan area network, a wide area network, a personal area network and/or the like. Alternatively, the network 18 may be a wireless network, such as, for example, a wireless metropolitan area network, a wireless local area network, a wireless personal area network, a global standard network, a personal communication system network, a pager-based service network, a general packet radio service, a universal mobile telephone service network, a radio access network and/or the like. The present invention should not be limited to a specific embodiment of the network 18. It should be understood that the network 18 may be any network capable of delivering the multimedia files 26a, 26b and/or media content to the terminals 12a-12c as known to one having ordinary skill in the art.

The media provider network source 16 may deliver, may distribute, may stream, may broadcast and/or may transmit the media content 20 and/or the multimedia files 26a, 26b to the terminals 12a-12c via the network 18. The media content 20 and/or the multimedia files 26a, 26b may be consumed by, may be displayed to, may be experienced by and/or may be rendered to the users 14a-14c via the terminals 12a-12c. It should be understood that the media content 20 and/or the multimedia files 26a, 26b may be delivered to the terminals 12a-12c by any means of transmission as known to one having ordinary skill in the art.

A storage device (not shown in the FIGURE) may be connected to and/or may be in communication with each of the terminals 12a-12c. The first library 24a and/or the second library 24b (hereinafter collectively known as "the libraries 24a, 24b") may be stored and/or may be contained within the storage device. The multimedia files 26a, 26b, and/or the media content 20 in the libraries 24a, 24b may be accessed from the storage device by the terminals 12a-12c, respectively for consuming and/or for experiencing by the users 14a-14c, respectively. As a result, the users 14a-14c may experience and/or may consume the media content 20 and/or the multimedia files 26a, 26b from the libraries 24a-24c, respectively, via the terminals 12a-12c.

The storage device may be a data storage device, such as, for example, an online digital storage locker, a flash memory/memory card, a solid state semiconductor memory, a magnetic bubble memory, a disk storage, a database and/or the like. In an embodiment, the storage device may be, for example, a digital video recorder, a personal video recorder, a hard disk recorder and/or the like. The storage device may permanently or may temporarily store the data, the media content 20 and/or the multimedia files 26a, 26b. It should be understood that the storage device may be any storage medium as known to one of ordinary skill in the art.

The terminals 12a-12c may have a guide application (not shown in the FIGURE), such as, for example, an electronic program guide (EPG), an interactive program guide and/or the like. The guide application may search, may locate, may identify, may navigate and/or may select the multimedia files 26a, 26b, the media content 20 and/or the metadata stored in the storage device. The guide application may have a graphical user interface (hereinafter "the GUI") for displaying the metadata corresponding to and/or based on the multimedia files 26a, 26b and/or the media content 20. The GUI may display the metadata in a display format, such as, for example, rows and/or columns. Further, the GUI may display the metadata in two dimensions or in three dimensions. Further, the GUI may be formatted in a standard data format, such as, for example, XML, RDF, RSS, MathML, XHTML, SVG, cXML, Flash, MS CSF and/or the like. It should be understood that the guide application, the display format of the GUI and/or the standard data format of the GUI may be any guide application, any display format and/or any standard data format, respectively, as known to one having ordinary skill in the art.

The multimedia files 26a, 26b and/or the media content 20 may contain advertising media which may relate to, may be associated with and/or may correspond to the network source 16. The advertising media may be, for example, a commercial, an advertisement, an audio transmission, a video, an interview, a commentary, a documentary and/or the like. In an embodiment, the advertising material may relate to, may be associated with and/or may correspond to an entity, such as, for example, a corporate entity, a marketing agency, a media distributor, a consumer products producer, an advertising agency, a manufacturer, a government agency, a travel corporation, an entertainment corporation and/or the like. The present invention should not be limited to a specific embodiment of the entity associated with the advertising media. It should be understood that the advertising media may be any type of media as known to one of ordinary skill in the art.

An appearance of the EPG and/or of the GUI may be personalized, may be customized and/or may be modified by each of the users 14a-14c for displaying the metadata of the media content 20 and/or the multimedia files 26a, 26b. The appearance of the EPG and/or the GUI may be related to and/or may be associated with a display element of the EPG and/or of the GUI, respectively. The display element of the appearance may be, for example, a format, a language, a color, an orientation, a visual aspect and/or the like. The present invention should not be deemed as limited to a specific embodiment of the display element of the appearance of the EPG and/or of the GUI.

The first user 14a may; select and/or may identify the multimedia file 26a from the first library 24a via the GUI, the EPG and/or the first terminal 12a. The first terminal 12a may be connected to and/or may be in communication with the second terminal 12b via the network 18 and/or the guide application of the first terminal 12a. The first user 14a may invite the second user 14b to participate in a shared viewing session between the first terminal 12a and the second terminal 12b (collectively known hereinafter as "the terminals 12a, 12b") to share consuming and/or experiencing the multimedia file 26a. The second user 14b may select to participate in the shared viewing session with the first user 14a via the GUI, the EPG and/or the second terminal 12b. The second terminal 12b may communicate to the first terminal 12a that the second user 14b may desire to participate in the shared viewing session with the first user 14a via the network 18 and/or the guide application of the second terminal 12b. The first terminal 12a may invite the second terminal 12b to participate in the shared media session by any invitation/response model as known to one of ordinary skill in the art.

The first terminal 12a may transmit the metadata of the multimedia file 26a to the second terminal 12b via the network 18 and/or the guide application of the first terminal 12a. The second terminal 12b may identify the metadata of the multimedia file 26a to determine whether the second library 24b of the second terminal 12b may contain the multimedia file 26b for consumption during the shared viewing session. The second terminal 12b may determine whether the metadata of the multimedia file 26b may match the metadata of the multimedia file 26a. The metadata of the multimedia file 26b may match the metadata of the multimedia file 26a. The second terminal 12b may communicate to the first terminal 12a that the multimedia file 26b may match the multimedia file 26a for consumption in the shared viewing session.

Alternatively, the second library 24b may not contain the multimedia file 26b or the multimedia file 26a may not match the multimedia file 26b. The second terminal 12b may communicate to the first terminal 12a that the second terminal 12b may require obtaining and/or procuring the multimedia file 26b for consumption in the shared viewing session. The second user 14b may connect to and/or may be in communication with the network source 16 to obtain, to purchase and/or to access the media content 20 of the database 22 via the metadata of the multimedia file 26a, the network 18 and/or the second terminal 12b. The second terminal 12b may request the multimedia file 26b from the media content 20 in the database 22 for consumption in the shared viewing session with the first user 14a. The network source 26 may deliver the multimedia file 26b to the second library 24b via the network 18 and/or the second terminal 12b. The second terminal 12b may communicate to the first terminal 12a that the second library 24b may contain the multimedia file 26b which may match the multimedia file 26a for consumption in the shared viewing session. The first terminal 12a may identify and/or may determine that the multimedia file 26a may be common between the libraries 24a, 24b for consumption in the shared viewing session between the first user 14a and the second user 14b (collectively known hereinafter as "the users 14a, 14b").

A list 30 of common media content available may be displayed and/or may be rendered to the users 14a, 14b via the guide application, the GUI and/or the EPG of the terminals 12a, 12b, respectively. The list 30 of common media content available may display and/or may indicate that the multimedia files 26a, 26b may be common to the first libraries 24a, 24b. As a result, the users 14a, 14b may determine and/or may identify that the multimedia files 26a, 26b may be common between the users 14a, 14b for consumption in the shared viewing session based on the list 30 of common media content available. The list 30 of common media content available may contain and/or may display any number of multimedia files which may be common between the libraries 24a, 24b as known to one of ordinary skill in the art. The list 30 of common media content available may be compiled by the guide program and/or by the terminals 12a, 12b on a periodic basis, such as, for example, a daily basis, a weekly basis and/or a monthly basis for determining and/or for identifying any number of multimedia files which may be common between the libraries 24a, 24b.

The users 14a, 14b may select a viewing mode from the guide application via the terminals 12a, 12b, respectively, to display and/or to consume the multimedia files 26a, 26b, respectively, with the terminals 12a, 12b, respectively. Alternatively, the terminals 12a, 12b and/or the guide application may automatically select the viewing mode when the multimedia files 26a, 26b, respectively, may be common between the libraries 24a, 24b. The terminals 12a, 12b may attempt to initiate a playback of the multimedia files 26a, 26b, respectively, to initiate the common media session. The terminals 12a, 12b may determine that the multimedia files 26a, 26b, respectively, may be prepared to be consumed by the terminals 26a, 26b, respectively, to initiate the common media session.

Each of the terminals 12a, 12b may transmit a communication to each other to confirm that the common media session may begin via the network 18. The terminals 12a, 12b may await the communication from each other prior to initiating the common media session and/or the consumption of the multimedia files 26a, 26b, respectively. The terminals 12a, 12b may be required to consume the advertising media prior to consuming the multimedia files 26a, 26b and/or prior to transmitting the communication to each other. As a result, an initiation of the consumption of the multimedia files 26a, 26b in the common media session may be delayed and/or may be paused by the terminals 12a, 12b, respectively, based on a duration of the advertising media, such as, for example, thirty (30) seconds. In an embodiment, the initiation of the consumption of the multimedia files 26a, 26b may be delayed and/or may be paused by the terminals 12a, 12b, respectively, to correspond to and/or based on a moment of time, such as, for example, six (6) o'clock post meridiem. In an embodiment, the initiation of the consumption of the multimedia files 26a, 26b may be delayed and/or may be paused by the terminals 12a, 12b, respectively, based on a procurement period of time, such as, for example, three minutes, for procuring the version of the multimedia file 26b.

The consumption of the multimedia files 26a, 26b by the terminals 12a, 12b, respectively, may be synchronized to initiate the common media session via the network 18. As a result, a viewing of, a consumption of and/or an experience of the multimedia files 26a, 26b by the users 14a, 14b, respectively, may be synchronized by the terminals 12a, 12b and/or the guide application in the common media session. The users 14a, 14b may transmit a communication (not shown in the FIGURE) between each other during the consumption and/or during the experience of the multimedia files 26a, 26b, respectively, via the terminals 12a, 12b and/or a shared communication network (not shown in the FIGURE) over the network 18. The communication may be, for example, an icon, an emoticon, a text-based communication, a voice based communication, a photo-based communication, a real-time video based communication and/or the like. The communication may be stored by, may be accessed by and/or may be searchable by the terminals 12a, 12b for the users 14a, 14b, respectively, to re-experience the common media session. It should be understood that the communication may be any communication and/or any number of communications as known to one of ordinary skill in the art.

The users 14a, 14b may modify, may update, may procure and/or may revise the libraries 24a, 24b, respectively, to add and/or to subtract available media content in the libraries 24a, 24b. As a result, the list 30 of common media content available may be updated, may be modified and/or may be revised to indicate whether the multimedia files 26a, 26b may be common between the libraries 24a, 24b for consumption in the shared viewing session between the users 14a, 14b, respectively. The list 30 of common media content available may display that the multimedia files 26a, 26b may not be common between the libraries 24a, 24b, respectively, to the users 14a, 14b, respectively. As a result, the users 14a, 14b may terminate the shared viewing session by removing either of the multimedia files 26a, 26b from the libraries 24a, 24b.

In an embodiment, the list 30 of common media content available may indicate that two or more multimedia files (not shown in the FIGURE) and versions of the multimedia files (not shown in the FIGURE) may be common between the libraries 24a, 24b of the users 14a, 14b. The guide application may invite the users 14a, 14b to participate in the shared media session and/or to vote for and/or to select one of the two or more multimedia files for consumption in the shared media session via the terminals 12a, 12b. The second user 14b may vote for and/or may select one of the two or more multimedia files from the list 30 of common media content available to identify which one of the two or more multimedia files may be consumed in the shared media session.

The users 14a, 14b may select one of the two or more multimedia files for consumption during the shared media session based on criteria associated with the users 14a, 14b, the metadata of the two or more multimedia files, of the terminals 12a, 12b and/or of the network 18. In an embodiment, the criteria may be related to, for example, a newness of each of the two or more multimedia files, a popularity of each of the two or more multimedia files and/or the like. In an embodiment, the criteria may be related to a rank, a priority and/or an ordering of each of the two or more multimedia files which may be established by the users 14a, 14b via the terminals 12a, 12b, respectively. The guide application may rearrange and/or may modify the two or more multimedia files in the list 30 of common media content available based on the criteria via the terminals 12a, 12b. The present invention should not be deemed as limited to a specific embodiment of the criteria.

One of the two or more multimedia files from the list 30 of common media content available may be selected by the users 14a, 14b for consumption in the common media session. The terminals 12a, 12b may display and/or may consume the multimedia files 26a, 26b to the users 14a, 14b, respectively, as selected from the list of common media content available by the users 14a, 14b. The users 14a, 14b may consume and/or may experience the multimedia files together via the terminals 12a, 12b.

In an embodiment, the terminals 12a, 12b may be connected to and/or may be in communication with the third terminal 12c via the network 18 for inviting the third user 14c to participate in the common media session between the users 14a, 14b. The third user 14c may select to participate in the shared viewing session with the users 14a, 14b via the GUI, the EPG and/or the third terminal 12c. The third terminal 12c may communicate to the terminals 12a, 12b that the third user 14c may desire to participate in the shared viewing session via the network 18 and/or the guide application of the third terminal 12c.

The metadata of the multimedia files 26a, 26b may be transmitted to the third terminal 12c to identify the metadata of the multimedia file 26a for procuring and/or for obtaining media content 20 from the network source 26. The third terminal 12c may communicate to the terminals 12a, 12b that the third terminal 12c may be required to procure the media content 20 for consumption in the shared viewing session. The third user 14c may obtain, may purchase and/or may access the media content 20 of the database 22 which may match the metadata of the multimedia files 26a, 26b via the network 18 and/or the third terminal 12c. The network source 26 may deliver the media content 20 which may correspond to the multimedia files 26a, 26b to the third terminals 12c via the network 18. The third terminal 12c may communicate to the terminals 12a, 12b that the third terminal 12c may have accessed the media content 20 corresponding to the multimedia files 26a, 26b for consumption in the shared viewing session. The terminals 12a, 12b may identify that the multimedia file 26a may be common between the terminals 12a, 12b and the third terminal 12c.

The list 30 of common media content available may display and/or may indicate that the multimedia files 26a, 26b and the media content 20 may be common between the terminals 12a-12c. As a result, the users 14a-14c may identify that the multimedia files 26a, 26b may be common between the users 14a-14c for consumption in the shared viewing session based on the list 30 of common media content available. The list 30 of common media content available may contain and/or may display any number of the multimedia files 26a, 26b which may be common between the terminals 12a-12c as known to one of ordinary skill in the art.

The users 14a-14c may select a viewing mode from the guide application via the terminals 12a-12c, respectively, to display and/or to consume the multimedia files 26a, 26b and the media content 20, respectively, with the terminals 12a-12c, respectively. The terminals 12a-12c may attempt to initiate the common media session and/or may determine that the multimedia files 26a, 26b and the media content 20, respectively, may be prepared to be consumed by the terminals 26a-26c, respectively. Each of the terminals 12a-12c may transmit the communication to each other to confirm that the common media session may be initiated via the network 18. The terminals 12a-12c may await the communication from each other prior to initiating the common media session and/or the consumption of the multimedia files 26a, 26b and the media content 20, respectively. The initiation of the common media session may be delayed and/or may be paused by the terminals 12a-12c until the communication may be received by each of the terminals 12a-12c.

The consumption of and/or the experience of the multimedia files 26a, 26b and the media content 20 by the users 14a-14c, respectively, may be synchronized by the terminals 12a-12c and/or the guide application in the common media session. In an embodiment, the media content 20 may be broadcast to the third terminal 12c from the network source 16 during the common media session. The users 14a-14c may transmit the communication associated with the common media session between each other via the shared communication network and/or the network 18.

In an embodiment, the system 10 may be referred to as a social networking application for the users 14a-14c. The third user 14c may be, for example, unfamiliar with the users 14a, 14b. The third user 14c may access and/or may identify the list 30 of common media content available of the users 14a, 14b. Further, the third user 14c may access and/or may identify information relating to the libraries 24a, 24b of the users 14a, 14b, respectively. Still further, the third user 14c may access and/or may identify the communication between the users 14a, 14b during the common media session. The third user 14c may determine whether to associate with, to communicate with and/or to participate with the users 14a, 14b based on the list 30 of common media content available of the users 14a, 14b, the information relating to the libraries 24a, 24b and/or the communication between the users 14a, 14b during the common media session.

The first terminal 12a of the first user 14a may connect to and/or may invite the second terminal 12b of the second user 14b to participate in the shared viewing session of the multimedia files 26a, 26b via the network 18. The first terminal 12a may transmit metadata of the multimedia file 26a to the second terminal 12b for determining whether the multimedia file 26b may be accessible and/or may be consumable by the second terminal 12b. The second terminal 12b may procure and/or may obtain the multimedia file 26b from the network source 16 via the network 18. The list 30 of the common media content available may be displayed via the first terminal 12a and the second terminal 12b, respectively. The terminals 12a, 12b may be synchronized for the users 14a, 14b to share the consumption and/or the experience of the multimedia files 26a, 26b during the shared viewing session. The communication between the users 14a, 14b during the common media session may be transmitted between the terminals 12a, 12b via the shared communication channel over the network 18 before, during and/or after a playback of the multimedia files 26a, 26b.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A system for identifying multimedia for a first user and a second user, the system comprising:
    a first terminal connected to a network wherein the first terminal has a first media library of multimedia files wherein the first user consumes multimedia files of the first media library on the first terminal;
    first metadata associated with the multimedia files of the first media library wherein the first terminal stores the first metadata;
    a second terminal connected to the first terminal by the network and located remote relative to the first terminal wherein the second terminal has a second media library of multimedia files wherein the second user consumes multimedia files of the second media library on the second terminal; and
    second metadata associated with the multimedia files of the second media library wherein the second terminal stores the second metadata and further wherein the first terminal and the second terminal identify a list of common media content and further wherein the list of common media content indicates the multimedia files that are located in both the first media library and the second media library wherein the list of common media content is based on comparison of the first metadata to the second metadata and further wherein the first terminal and the second terminal display the list of common media content wherein a common media session of synchronized consumption of a multimedia file which encodes the multimedia is initiated for the first terminal and the second terminal in response to user input that selects the multimedia file from the list of common media content and further wherein the first terminal and the second terminal provide simultaneous and synchronized playback of the multimedia encoded by the multimedia file during the common media session of synchronized consumption.

2. The system of claim 1 wherein the first terminal transmits the first metadata to the second terminal.

3. The system of claim 1 wherein the second terminal performs the comparison of the first metadata to the second metadata.

4. The system of claim 1 wherein the first user pauses consumption of the multimedia file on the first terminal to pause consumption of the multimedia file on the second terminal.

5. The system of claim 1 further comprising:
a network source connected to the network wherein the network source transmits to the second terminal a new multimedia file corresponding to one of the multimedia files of the first media library that is not in the second media library.

6. The system of claim 1 wherein the first terminal transmits a first communication to the second terminal that indicates that the first terminal is ready to initiate the common media session and further wherein the second terminal transmits a second communication to the first terminal that the second terminal is ready to initiate the common media session wherein the common media session initiates in response to the first terminal receiving the second communication and the second terminal receiving the first communication.

7. The system of claim 1 wherein the first terminal sends a message to the second terminal indicating the multimedia files of the first media library that correspond to multimedia files of the second media library and further wherein the list of common media content is based on the message.

8. The system of claim 1 wherein the first terminal accepts user input from the first user during the common media session and further wherein the first terminal transmits a communication based on the user input from the first terminal to the second terminal during the common media session using the network wherein the second terminal displays the communication during the common media session.

9. The system of claim 1 wherein the first terminal accepts user input from the first user during the common media session and further wherein the first terminal transmits a communication based on the user input to the second terminal during the common media session using the network and further wherein the second terminal displays the communication during a second consumption of the multimedia file subsequent to the common media session.

10. A method for identifying multimedia for a first user and a second user, the method comprising the steps of:
connecting a first terminal and a second terminal to a network wherein the first terminal has a first media library of multimedia files and first metadata associated with the first media library of multimedia files and further wherein the second terminal has a second media library of multimedia files and second metadata associated with the second media library of multimedia files wherein the second terminal is located remote relative to the first terminal;
transmitting the first metadata from the first terminal to the second terminal;
generating a list of common media content wherein the list of common media content is determined based on comparison of the first metadata to the second metadata and further wherein the list of common media content indicates the multimedia files of the first media library that correspond to the multimedia files of the second media library wherein the list of common media content indicates that a first multimedia file of the first media library corresponds to a second multimedia file of the second media library and further wherein the second multimedia file is a different file than the first multimedia file;
displaying an electronic program guide via the first terminal and the second terminal wherein the electronic program guide provides the list of common media content; and
initiating a common media session of synchronized playback of the first multimedia file for the first terminal and the second multimedia file for the second terminal in response to user input on at least one of the first terminal and the second terminal.

11. The method of claim 10 further comprising the step of:
updating the list of common media content on a periodic basis.

12. The method of claim 10 further comprising the step of:
sending a message from the first terminal to the second terminal which is an invitation for the second user to partake in the common media session of synchronized playback wherein the user input which initiates the common media session of synchronized playback is user input on the second terminal that indicates acceptance of the invitation.

13. The method of claim 10 further comprising the step of:
providing a graphic user interface on the first terminal and the second terminal that allows the first user to select the first multimedia file from the list of common media content and allows the second user to select the second multimedia file from the list of common media content wherein the graphic user interface displays the first metadata associated with the multimedia files of the first media library that correspond to the multimedia files of the second media library.

14. The method of claim 10 further comprising the step of:
indicating multimedia files that are in the first media library that do not have corresponding multimedia files in the second media library wherein the second terminal indicates to the second user the multimedia files that are in the first media library that do not have corresponding multimedia files in the second media library.

15. The method of claim 10 further comprising the step of:
transmitting a new multimedia file that corresponds to one of the multimedia files of the first media library that is not in the second media library wherein a media store transmits the new multimedia file to the second terminal.

16. A system for identifying multimedia for a first user and a second user, the system comprising:
a network connected to a media provider wherein the media provider has a first media library of multimedia files;
a first terminal connected to the network wherein the first terminal has a second media library of multimedia files and further wherein the first terminal enables the first user to consume multimedia files of the second media library; and
a second terminal connected to the first terminal by the network and located remote relative to the first terminal wherein the second terminal has a third media library of multimedia files and further wherein the second terminal enables the second user to consume multimedia files of the third media library wherein the first media library, the second media library and the third media library are located at different locations wherein the first terminal and the second terminal identify a multimedia file of the second media library that is not one of the multimedia files of the third media library and further wherein the multimedia file encodes the multimedia wherein the second terminal accesses the first media library via the network to obtain the multimedia file from the media provider and further wherein a common media session of synchronized consumption of the multimedia file is initiated for the first terminal and the second terminal such that the first terminal and the second terminal initiate the synchronized consumption of the multimedia file wherein the first terminal and the second terminal provide simultaneous and synchronized playback of the multimedia encoded by the multimedia file during the common media session of synchronized consumption.

17. The system of claim 16 wherein the first user pauses consumption of the multimedia file on the first terminal to pause consumption of the multimedia file on the second terminal.

18. The system of claim 16 wherein communications are transmitted from the first terminal and the second terminal to each other wherein the communications initiate the common media session.

19. The system of claim 16 wherein the first terminal and the second terminal delay initiation of the common media session for a time period after the second terminal indicates that the second terminal will participate in the common media session and further wherein the time period is based on an amount of time required for the second terminal to obtain the multimedia file from the media provider.

20. The method of claim 10 wherein the first multimedia file and the second multimedia file encode the same multimedia content.

21. The method of claim 10 wherein the second multimedia file is a different version of the first multimedia file.

* * * * *